United States Patent [19]
Allen

[11] 3,888,211
[45] June 10, 1975

[54] POULTRY RAISING SYSTEM AND PROCESS

[76] Inventor: John A. Allen, 1674 Valley High, Thousand Oaks, Calif. 91360

[22] Filed: Jan. 23, 1974

[21] Appl. No.: 435,807

Related U.S. Application Data

[63] Continuation-in-part of Ser. No. 230,838, March 1, 1972, abandoned, which is a continuation-in-part of Ser. No. 179,890, Sept. 13, 1971, abandoned.

[52] U.S. Cl. .................................... 119/18; 119/21
[51] Int. Cl. ............................................ A01k 39/00
[58] Field of Search .......... 119/18, 21, 22, 51 R, 48

[56] References Cited
UNITED STATES PATENTS
2,257,734  10/1941  Cornell .............................. 119/21
3,319,606  5/1967  Virgil ................................ 119/48 X Primary Examiner—Hugh R. Chamblee
Attorney, Agent, or Firm—Jessup & Beecher

[57] ABSTRACT

A system and process is provided for the feeding and growth of egg and meat producing fowl, small animals and the like. A house or enclosure gives full weather protection and variable environmental controls, such as air movement, temperature and light density, for ultimate growth and production conditions. Multi-decked containers for the fowl are suspended in the enclosure, and these are constructed to simplify cleaning and the removal of solid wastes. An automatic feeding and watering system is mounted adjacent each of the containers. The containers are supported on overhead conveyor trolleys so that they can be readily moved into the enclosure at the beginning of the growth cycle, and readily removed from the enclosure when the growth cycle has been completed.

23 Claims, 24 Drawing Figures

PATENTED JUN 10 1975  3,883,211

SHEET 1

INVENTOR
John A. Allen

BY Warren T. Jessup
ATTORNEYS

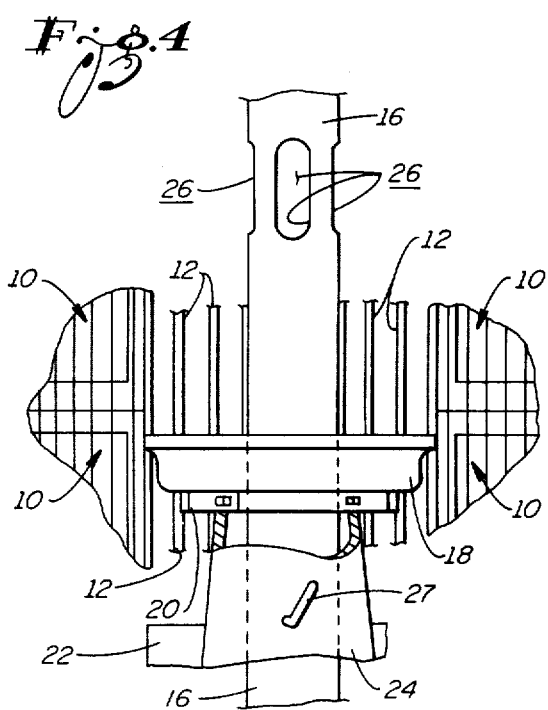

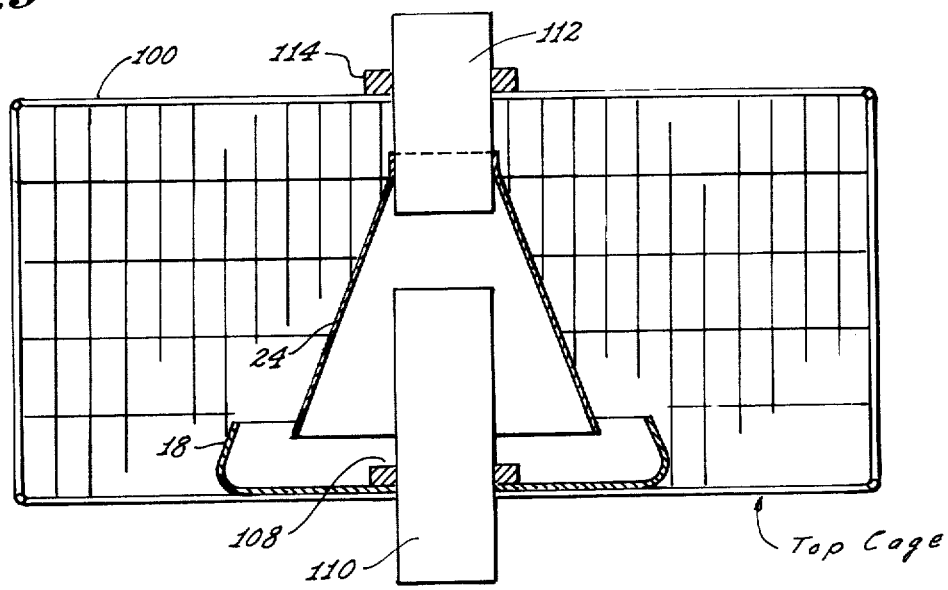
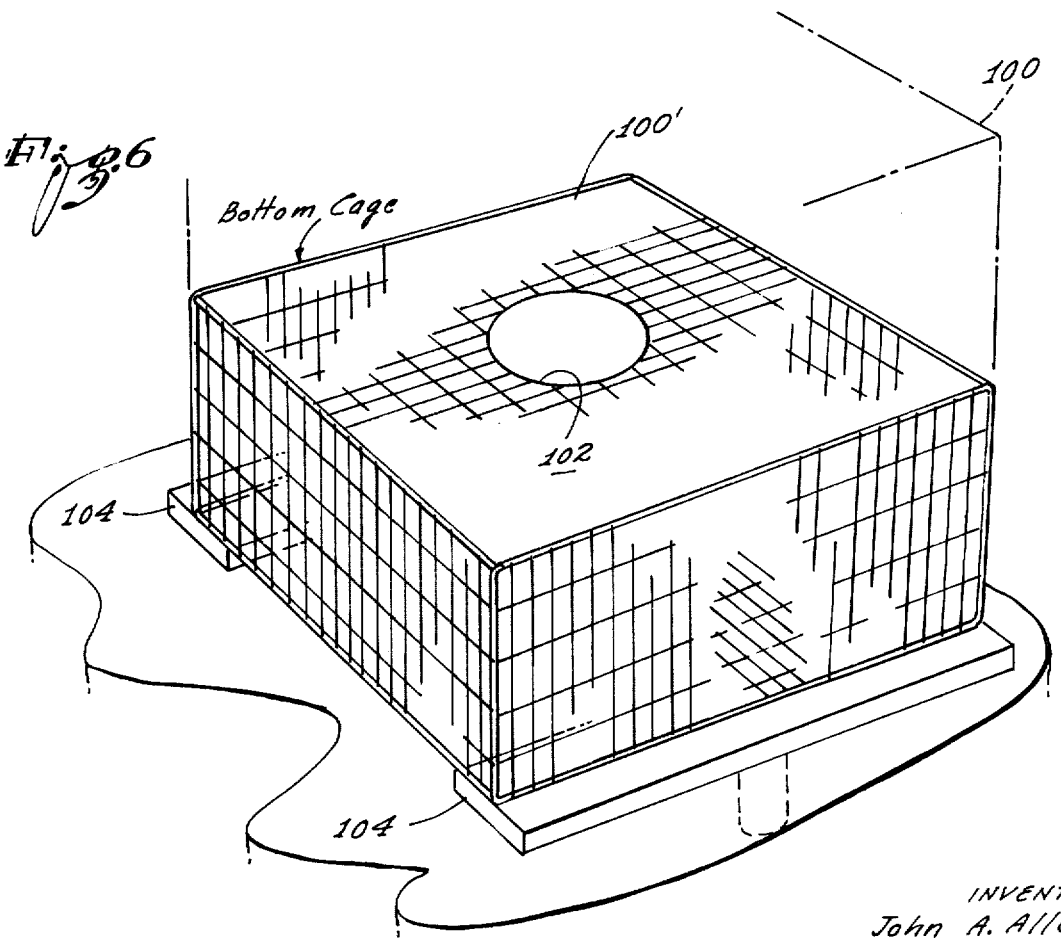

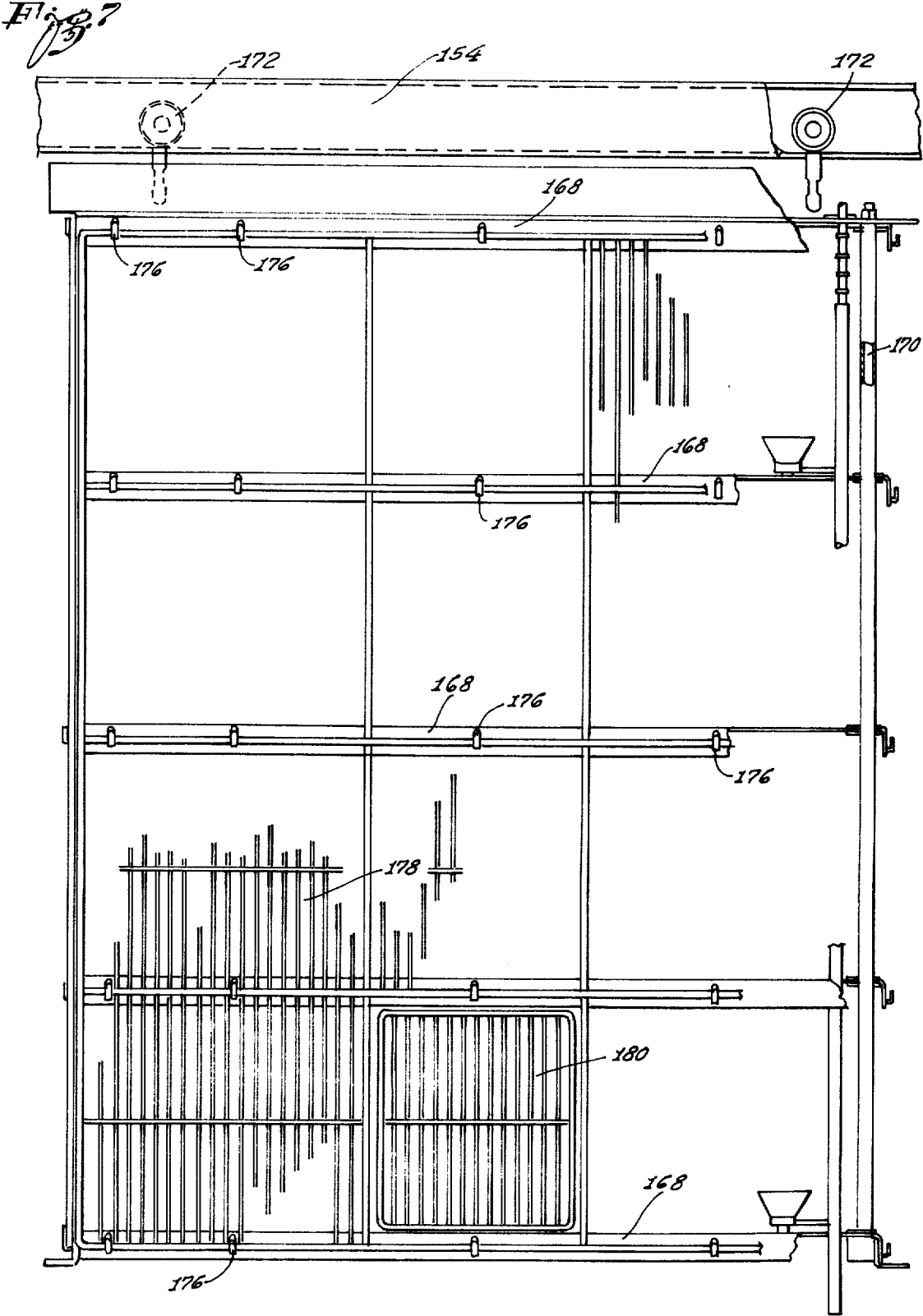

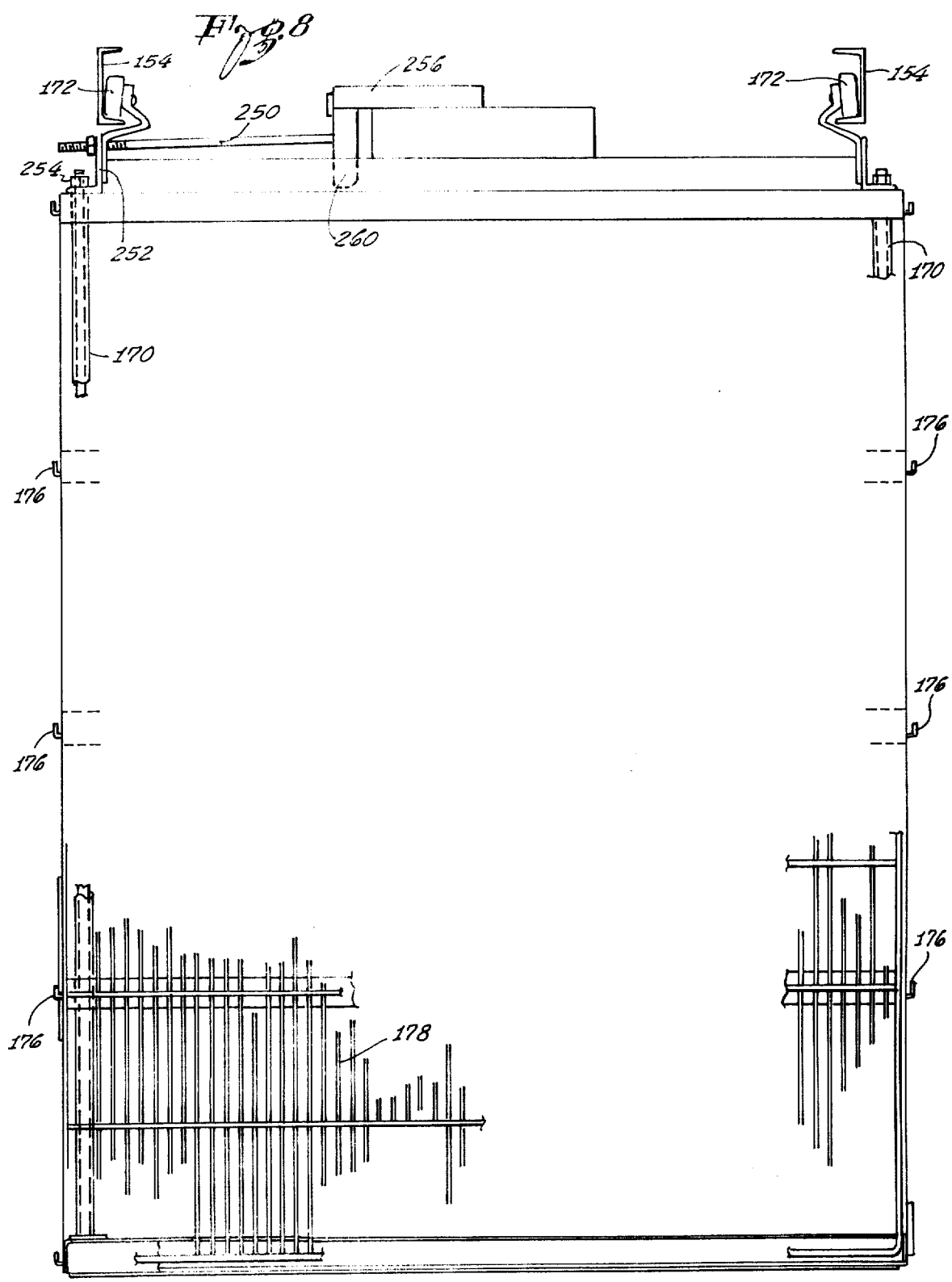

(Feeder Lift Mechanism)

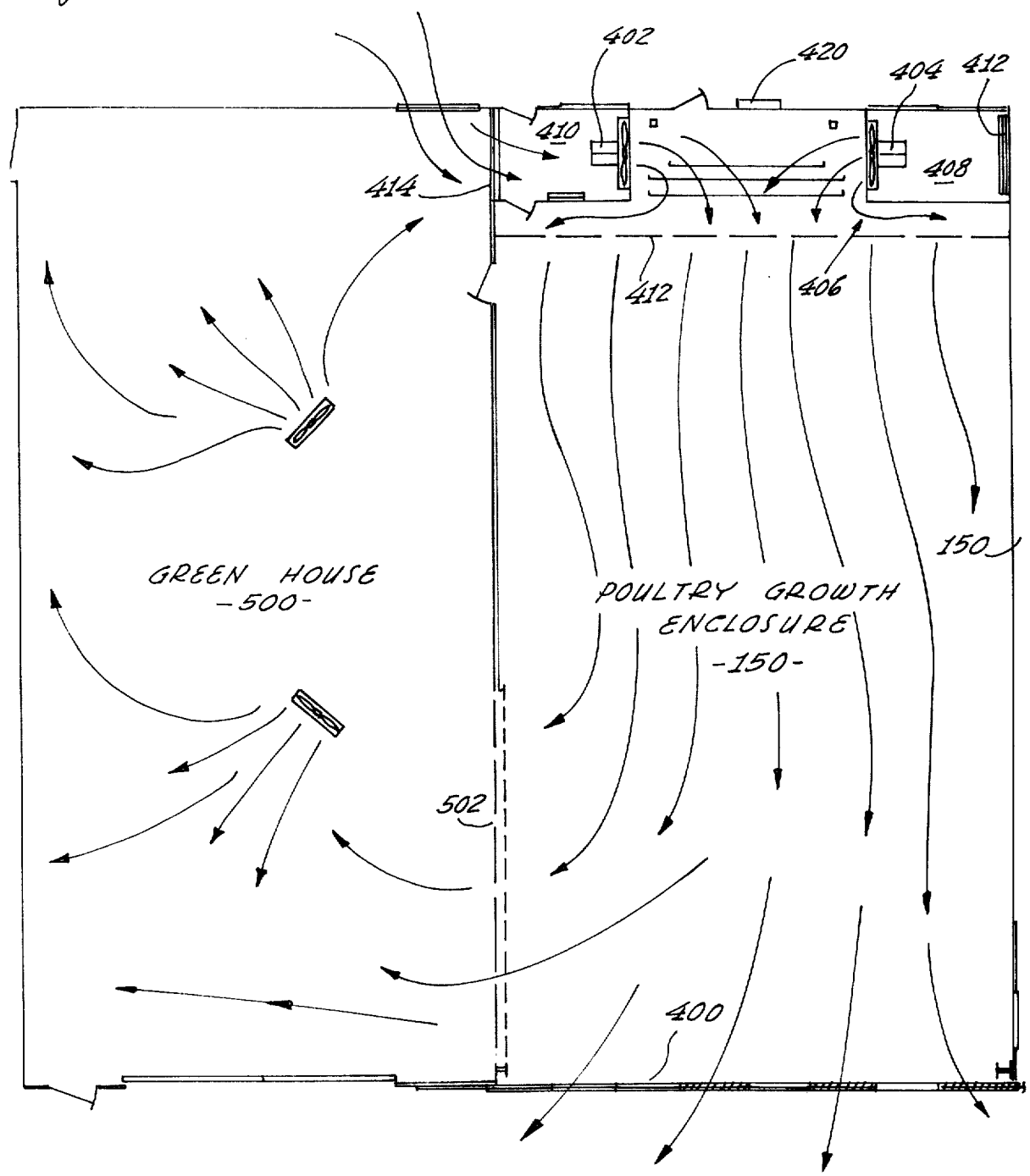

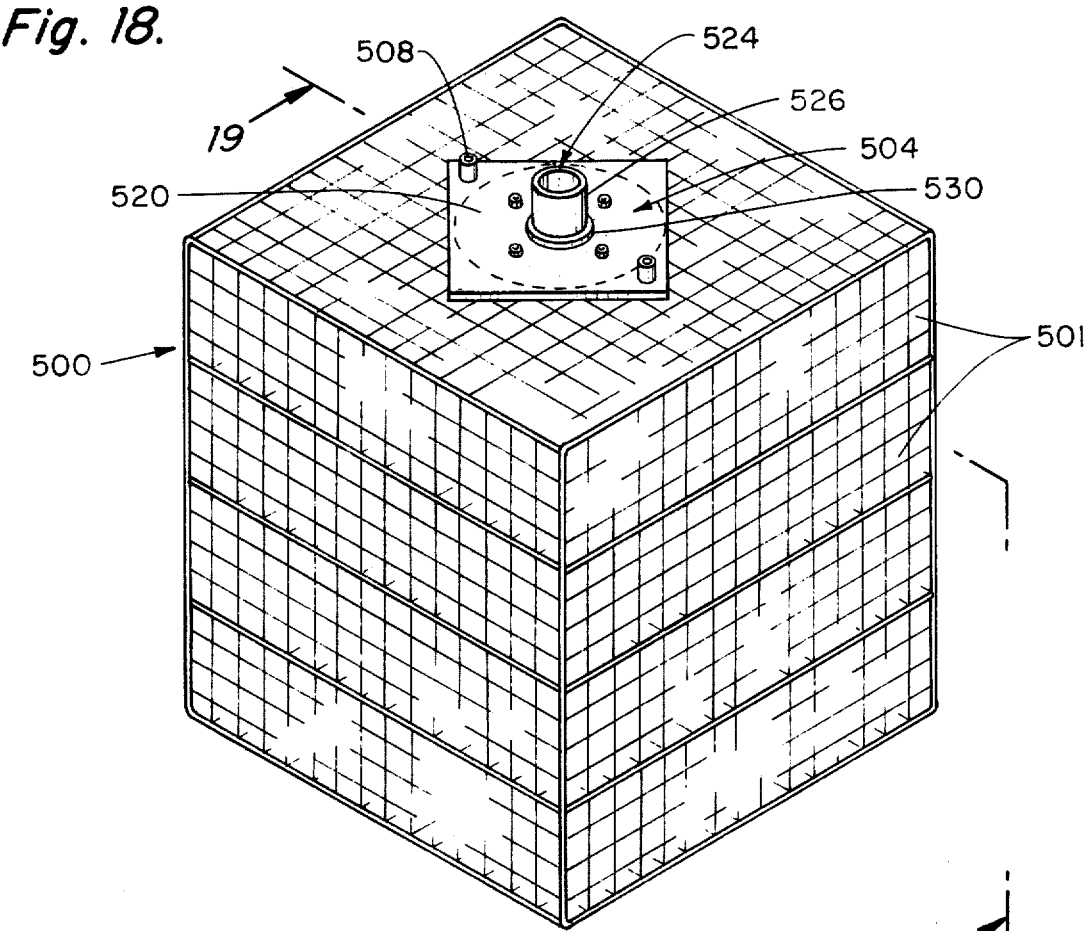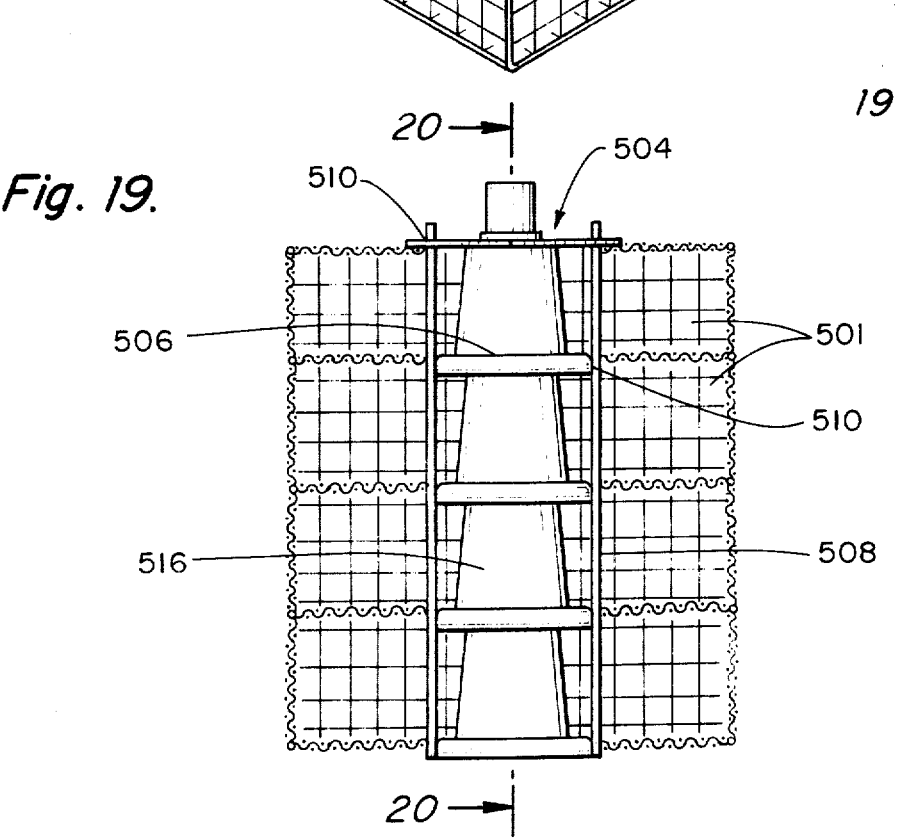

3,888,211

POULTRY RAISING SYSTEM AND PROCESS

BACKGROUND OF THE INVENTION

This application is a continuation-in-part of copending application Ser. No. 230,838, filed Mar. 1, 1972, in turn a continuation-in-part of application Ser. No. 179,890, filed Sept. 13, 1971, now both abandoned.

The provision of a system and process for the feeding and growth of fowl, whereby the fowl may be fed and housed, and subsequently transported to an egg ranch or meat processing facility, has long been a problem. This problem is obviated by the system and process of the present invention, in which manual labor and manual handling of the fowl is reduced to a minimum, in which the fowl are raised under ideal conditions, free from shock or other hazards, and in which waste removal is facilitated so that there is a minimum tendency for the spreading of disease.

The invention provides an improved process and system for the feeding and growth of fowl, and the like, and specifically for the feeding and waste removal of the fowl by gravity, and for the ultimate transportation of the fowl to slaughter or egg producing centers. Although the system of the invention shall be described herein, specifically in conjunction with fowl, the system may be used for the growth of other types of birds and small animals.

When in the enclosure or building, the multi-decked containers or cages are suspended up from the floor, and the decks themselves are provided with openings, so that solid wastes from the fowl may drop through the containers to the floor of the enclosure, for frequent and easy removal so as to eliminate offensive odors in the enclosure, and for biological and ecological reasons.

In accordance with the process of the invention, in one of its embodiments, baby fowl are loaded into the containers at an early age at which fright and physical damage are minimized, and the containers are then moved into the enclosure. The fowl are then allowed to develop in the enclosure, within intimate reach of food and water. The environment of the enclosure is precisely controlled for optimum growth conditions. When the growth period has been completed, the loaded containers are removed from the enclosure and transported by suitable means to the egg producing plant or slaughter house, at which the fowl may be transferred to their egg producing cages or slaughter with a minimum of labor and with a minimum of fright or physical damage.

In a second embodiment of the process, the enclosure is first thoroughly cleaned of waste products and then filled with empty, previously cleaned multi-decked containers, and the whole interior of the enclosure, and the containers, are then fumigated for biological reasons. The container feed system is then filled and the desired ambient conditions for the enclosure are established. Then the containers are hand loaded with baby fowl in order to expose the fowl to minimum shock and uninterrupted growth pattern.

After growth of the fowl, they are removed from the enclosure in their containers, by conveyors or by the containers being loaded onto trucks, for example, and carried to the point of delivery with a minimum of time delay and with a minimum of physical damage to the fowl. Each truck delivers its load, for example, to a meat processing facility where the containers are promptly unloaded and placed into a conveyor track to be moved to the processing area. In this way, the fowl are not handled in any way and are not unduly exposed from the time they are moved from the growth enclosure to the point and time of slaughter.

At the slaughter facility, and in order to prevent damage to the tender fowl during the slaughter processes, the containers may be passed through a chamber with an internal atmosphere sufficiently low in oxygen to cause the fowl to become docile or unconscious to a point at which they will not damage their bodies from fright during the slaughter operation.

At the completion of the delivery cycle, the empty containers may be thoroughly cleaned by passing them, for example, upside down on a conveyor through a multiplicity of heated power washer stages. For example, the first washer stage may use high-pressure water jets to impinge on all parts of the containers so as to remove all solid waste, including feed; the second washer stage may utilize hot caustic water under pressure to complete the cleaning action of all parts of the containers, and the third washer stage may use warm water containing bactericide, or the like, to insure thoroughly cleaned and bacteria-free and virus-free containers, when they are returned to the growth enclosure.

Preferably, the aforesaid cleaning process is automatic in nature, eliminating personnel as much as practical form its functions. For this purpose a powered conveyor may be used to carry the containers in an upside down condition through the various stages of the cleaning mechanism at controlled speed.

The enclosure itself has its environment completely controlled so as to insure optimum growth conditions. Specifically, the enclosure is fabricated so that all ventilation and light requirements are controlled by artificial means, with the ambient air being carefully set to desired conditions for optimum growth, and then caused to flow evenly through the enclosure from one end to the other and out the other end. In addition, artificial light is provided and controlled to the exact candle power desired for the particular fowl being grown in the enclosure. A prime reason for light control is to reduce cannibalism, and preferably all natural light is eliminated, so that complete control of the lighting may be effectuated artificially.

An important component of the process of the invention is the multi-decked container referred to above. Each container is designed and fabricated to be of a sturdy construction to be easily shipped and stored in a flat, dismantled condition, and to be easily assembled and disassembled by relatively unskilled persons using usual hand tools. The particular containers to be described herein include a plurality of decks, each of which is wire formed, or composed of a perforated metal or plastic sheet. In each instance the deck is designed so as to have sufficient open area for the adequate passage of droppings from the fowl through the lower decks and onto the floor of the enclosure without plugging the openings. Also, the openings are made sufficiently small so that there is no tendency for the fowl to stick their feet or legs into the openings with resulting damage thereto.

When the decks of the containers are made of metal, they are preferably covered with a rubber-like coating or mat, which is resistant to corrosion by the droppings, and which is susceptible to cleaning, for example, by the process described above. The containers, as will be described, are constructed for use with an automatic feed supply, and are capable of being operatively connected to the supply without special tools. A feature of the system of the invention is the provision of means for adjusting the height of the feed supply trays with respect to the decks. to correspond with the growth height of the fowl, and to permit height adjustments to be made to the feed trays as the fowl grow larger.

The system and process of the invention includes an automatic feed system which brings feed automatically at the different deck levels to the individual compartments of each of the containers. The feed system to be described includes a vertical feed tube which extends through the center of each container in certain embodiments, with the feed being introduced into the interior of the tube. Feed holes or openings are provided in the tubes at the various deck levels, and each feed hole is surrounded by a feed silo which permits the feed to drop into the feed tray at each deck in the individual containers.

By properly locating the feed holes in the aforesaid vertical feed tube, the feed silos are filled progressively slower as feed travels down the vertical tube from top to bottom. This optimizes the standby capacity of the feed system, permitting reasonable delays in the feed delivery to the use point. That is, even if the vertical feed tube starts to empty, the excess of feed in the upper feed silos still provides adequate feed to the feed trays of the upper decks of the containers, even though the feed level in the vertical feed tube should drop below the openings for the upper decks The multi-decked containers in the system and process of the invention, as will be described, are preferably suspended by dollies from an overhead rack suspension system, so as to permit the cages to be easily removed from the enclosure and loaded into trucks or otherwise transported to the egg producing centers or meat processing centers, as described above. The empty containers are subsequently cleaned and sterilized, as described, and returned to the enclosure for subsequent use.

BRIEF DESCRIPTION OF THE DRAWINGS

FIG. 4 is a view like FIG. 3, revealing the manner in which the feed tray may be supported on the vertical feed tube in the feeder system as illustrated in FIGS. 2 and 3;

FIG. 5 is a side section of a top container and apparatus representing a modification of the container shown in FIG. 1;

FIG. 6 is a top perspective representation of a bottom container in the embodiment of FIG. 5;

FIG. 7 is a side view of a further multi-decked container for use in the process and system of the invention, and representing a preferred embodiment, the container in FIG. 7 being shown suspended on appropriate trollies from a rack, and supported thereby up from the floor of the enclosure;

FIG. 8 is an end view of the container of FIG. 7 and showing further details of the suspending trolley and rack system, as well as details of a feeder lift mechanism which is used in conjunction with the feeder associated with the multi-decked container of FIGS. 7 and 8;

FIG. 17 is a top plan view of the growth enclosure contained within the facility of FIG. 16, and of the various controls incorporated in the enclosure for maintaining optimum ambient conditions for the fowl in the growth enclosure;

FIG. 18 is an isometric view of still another embodiment of the present invention;

FIG. 19 is an elevational section taken on line 19—19 in FIG. 18;

DETAILED DESCRIPTION OF THE ILLUSTRATED EMBODIMENTS

Figure 1:
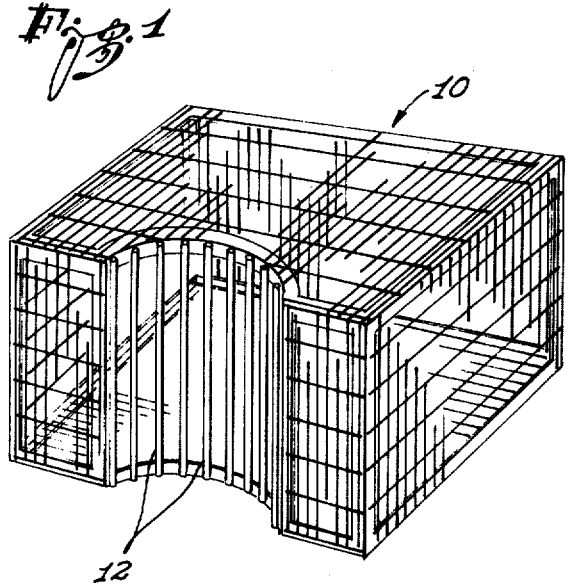
FIG. 1 is a perspective representation of a container which may be used in the system and process of the invention and which is configured to have an arcuate-shaped side to receive the vertical feed tube of the feeder system of the invention.
Figure 2:
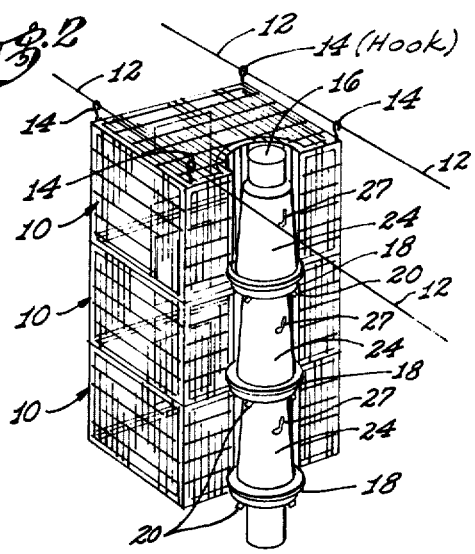
FIG. 2 shows a vertical stack of containers of the type shown in FIG. 1, and an associated vertical feeder system which likewise may be used in the system and process of the invention.

The containers or cages used in the system and process of the invention, and in which the fowl are grown, may have the configuration shown in FIG. 1, as designated by the container 10. As shown, a portion of one of the sides of the container 10 has an arcuate shape, with vertical bars 12 extending from one end of the arcuate portion to the other. In the practice of the process of the invention, and with the container embodiment shown in FIGS. 1–4, containers 10 are attached to one another to form a vertical stack such as shown in FIG. 2, and the stack is suspended as a multi-decked container, for example, on an appropriate rack 13 and by means of hooks 14, or other means, which will be described. The rack 13 may be supported in any appropriate manner near the ceiling of the growth enclosure, and the containers are held by the rack up from the floor of the enclosure, so that droppings from the fowl in each container will fall through the lower decks and onto the floor of the enclosure, so that the resulting waste material may be easily and frequently removed. The stack of containers shown in FIG. 2 is suspended adjacent a feeder system which also forms part of the process of the invention, and which incorporates a vertical feed tube which is filled with feed, as will be described.

As mentioned above, it is preferable for the stack of containers 10 to be suspended up off the floor of the enclosure, so that droppings of the fowl may fall through the lower decks to accumulate on the floor of the enclosure, so as to be readily removed. A second stack of containers similar to the stack shown in FIG. 2, may be positioned adjacent the stack of FIG. 2, so that the two stacks completely surround the vertical feeder system. In this way a single feed tube is used to provide feed for the containers of the two stacks.

Figure 3:
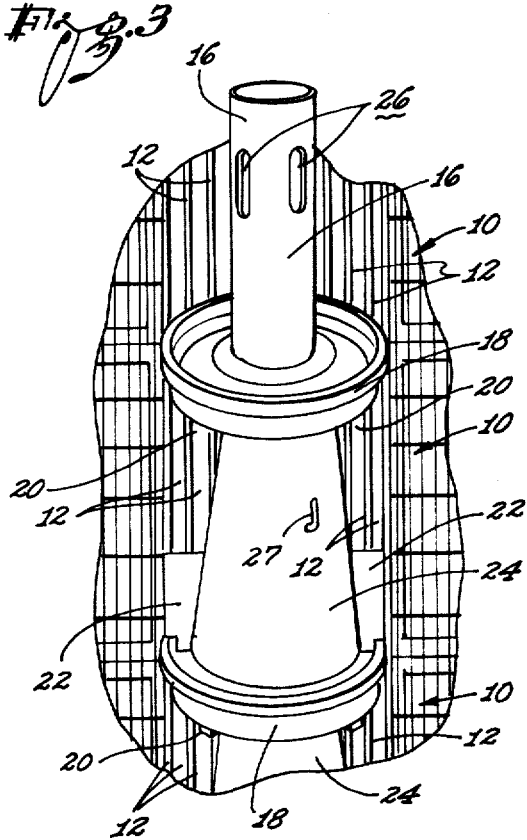
FIG. 3 is a view similar to FIG. 2, but with one of the feed silos removed to reveal the vertical feed tube of the feeder system and the corresponding openings therein.

The feeder system shown in FIGS. 2, 3 and 4 comprises a vertical tube 16 which may be supported in the individual containers, or which may be mounted on the floor of the enclosure. A series of similar vertical tubes 16 may be provided at different positions in the growth enclosure, and stacks of containers, such as the containers 10, may be clustered around each individual feeder tube. Then, the vertical feeder tubes may be fed with feed by an auger in horizontal conduits, so that each vertical tube may be maintained full of feed.

A plurality of dish-shaped annular feed trays 18 are supported on each vertical feed tube 16 at spaced positions along the tube corresponding to the different deck levels. Each of the trays has an upwardly extending peripheral lip portion, as shown more clearly in FIG. 3. The annular trays 18 are supported on the vertical tube 16 by means, for example, of support brackets 20; the support brackets each including, for example, a central ring-like section which engages the tube 16 in a press-fit relationship, and a series of radial spokes extending outwardly from the central section. The individual feed trays 18 are supported on the corresponding support brackets 20, at selected vertical positions under corresponding feed holes 26 in the vertical feed tube, and at levels corresponding to the levels of the various containers in the stacks. In this way the fowl in the individual containers may reach through the bars 12 and obtain the feed which accumulates in the various feed trays. Appropriate shields 22 may be provided, as shown in FIG. 3, for example, to permit the fowl from leaving their own containers through the bars 12 and moving around the pans 18 to the adjacent containers.

Conical-shaped silos 24 are also supported on the vertical feed tube 16. Each of the silos 24 surrounds a corresponding series of feed holes 26 in the tube. The silos are supported so that their lower edges, in each instance, are spaced up from the bottom of their corresponding feed trays 18. The silos are so supported, for example, by removable pins 27 which extend through the silos and into the tube 16.

The feed trays 18 are supported on the vertical feed tube 16 at progressively greater distances down from the corresponding feed holes 26 from the bottom to the top of each feed tube. In this way, an even distribution of feed is provided for the individual feed trays, as explained above, even though the level of feed in the vertical feed tube may drop. By the selective positioning of the feed trays 18 from the corresponding holes 26 as mentioned above, a more or less uniform supply of feed is assured to the various trays as the feed is removed by the fowl.

It will be appreciated that for a continuous supply of feed, it is merely necessary to maintain the vertical feed tubes 16 full of feed, since the silo-tray combination assures that the feed trays will always be full but not overflowing. There is no need periodically to replenish the feed in the vertical feed tubes 16, since the feed in the tube automatically assures that each tray will be maintained in a filled condition so long as the tube itself is kept full of feed. The latter criteria may be achieved, as suggested above, by the provision of a horizontal conduit and auger combination, which maintains a flow of feed into the vertical tube 16.

In the embodiment of FIGS. 5 and 6, the stacks of containers of FIG. 2 are replaced with a single multi-decked container with a multiplicity of vertically disposed compartments 100. FIG. 5, for example, represents the top compartment 100, and FIG. 6 represents the bottom compartment 100'. Each compartment is provided with a central aperture 102 in its top and bottom. The compartments of the multi-decked container of FIGS. 5 and 6 are conveniently supported, for example, as shown in FIG. 6, on elongated platforms 104 which, in turn, are supported up from the floor of the enclosure on appropriate stub pedestals which may be embedded in the concrete of the floor.

The container is mounted on the platforms 104 in a manner such that a similar multi-decked container may be supported on a plurality of like platforms in side-by-side relationship. Each multi-decked container may be removed from its supporting platforms merely by inserting the fork of a fork-truck under the container and thereby removing the container; this being achieved without interfering in any way with the other containers. All that need be done prior to the removal of any container, for example, would be to disconnect the water supply element. As will be described, the feeder apparatus which is inserted in the central aperture 102, as shown in FIG. 5, remains in the container and is removed with the compartment.

In the embodiment of FIGS. 5 and 6, the feeder trays or pans 18 are mounted within the individual compartments of each container and are affixed, for example, to the bottom of each compartment around the central hole in the bottom. A collar 108 is mounted around the hole in the bottom of each compartment, centrally within the corresponding pan 18. Each collar 108 supports a short length of pipe 110 in a press-fit relationship. The uppermost compartment 100, such as shown in FIG. 5, has an additional pipe 112 extending through a hole in its top, and supported, for example, by a collar 114. The conical silo 24 is supported within the compartment 100, for example, in a press-fit relationship with the pipe 112, or the silo 24 may be supported in the manner shown in FIG. 4.

The pipe 112 may be adjusted to any convenient height so that it comes directly under the auger feed conduit referred to above. The pipe 110 is then adjusted longitudinally in its collar 108 so as to provide a desired opening between the bottom of the pipe 112 and the top of the pipe 110 within the silo 24, as shown in FIG. 5. The pipe 110 extends down into the next lower compartment through a corresponding central hole in the top of the lower compartment. The lowermost compartment 100' in FIG. 6 has a similar feed assembly such as shown in FIG. 5, and it also has a conical silo 24 (not shown) engaging the lowermost end of the pipe 100 from the next upper compartment.

The pipe 110 between the various vertical compartments may be adjusted to provide for different heights in each compartment, extending up from the bottom of the corresponding pan 18, for a uniform feed, as in the previous embodiment. The height of the pipe 110 in the individual compartments would be large at the top and would diminish toward the bottom of the container. In each instance the space between the successive pipes 110 within the individual compartments would remain essentially constant. For example, in a constructed embodiment, the individual pipes 110 had a length of 14 inches, and the space in between successive pipes in the multi-level container was of the order of four inches. In this way substantially uniform dispensing of feed to the several tiered compartments is effected, even though the feed tubes 112/110 are not kept filled. Thus, even though the feed level may drop below the upper edge of the uppermost pipe or tube 110, the feed stored in the uppermost silo 24 will continue to supply the tray 18. Hence, even if feed supply to the top pipe 112 is stopped, all trays 18 will be depleted at substantially the same time.

In a further embodiment, such as shown in FIGS. 7 and 8, the containers designated 156 are each made up of a plurality of decks 168, which are supported on vertical rods, such as the rods 170 in FIGS. 7 and 8. The decks 168 may, for example, have the form shown in the plan view of FIG. 9, the plan view being of an apertured deck before the edges are folded down.

Figure 9:
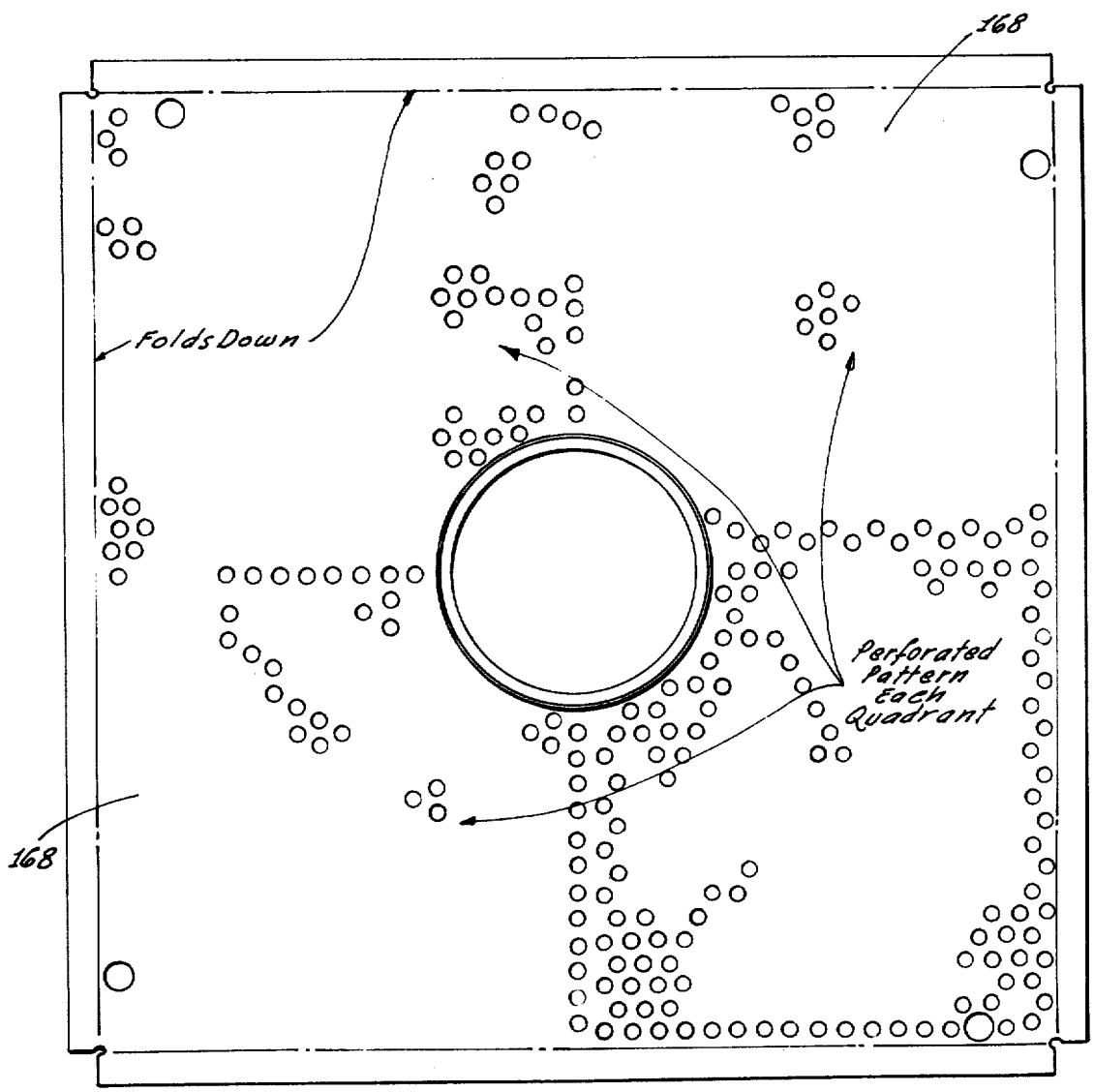
FIG. 9 is a plan view of a perforated deck, suitable for use in the container of FIGS. 7 and 8.

The decks 168, for example, may be formed of perforated metal or plastic sheets. A sheet with three-quarter inch diameter holes, spaced to provide a 30% open area, for example, has been found to be satisfactory to provide an adequate passage for the droppings from the fowl through the lower compartments and to the floor below without plugging. Also, such holes are sufficiently small so that the fowl will not poke their legs into them with resulting damage. Each of the central decks 168, as shown in FIG. 9, has a central hole 174. The vertically aligned holes 174 form a shaft which receives a vertical feeder tube, as will be described.

The edges of the decks 168 are turned down, as shown in FIG. 7, and a plurality of clips 176 are formed on the turned-down edges. The sides of the containers are wire formed, as designated 178 in FIGS. 7 and 8, and the sides hang on the clips 176, as shown. Appropriate doors, such as the door 180, are provided, for example, for each deck so as to permit access to the individual compartments of each container.

It will be appreciated that with the construction shown in FIGS. 7 and 8, the individual containers may be easily dismantled and shipped in a flat condition. Also, the individual containers are relatively easy to assemble and do not require any particular skill, or any tools other than usual hand tools. The containers themselves are of a sturdy construction, and they may be easily cleaned and sterilized.

Figure 10:
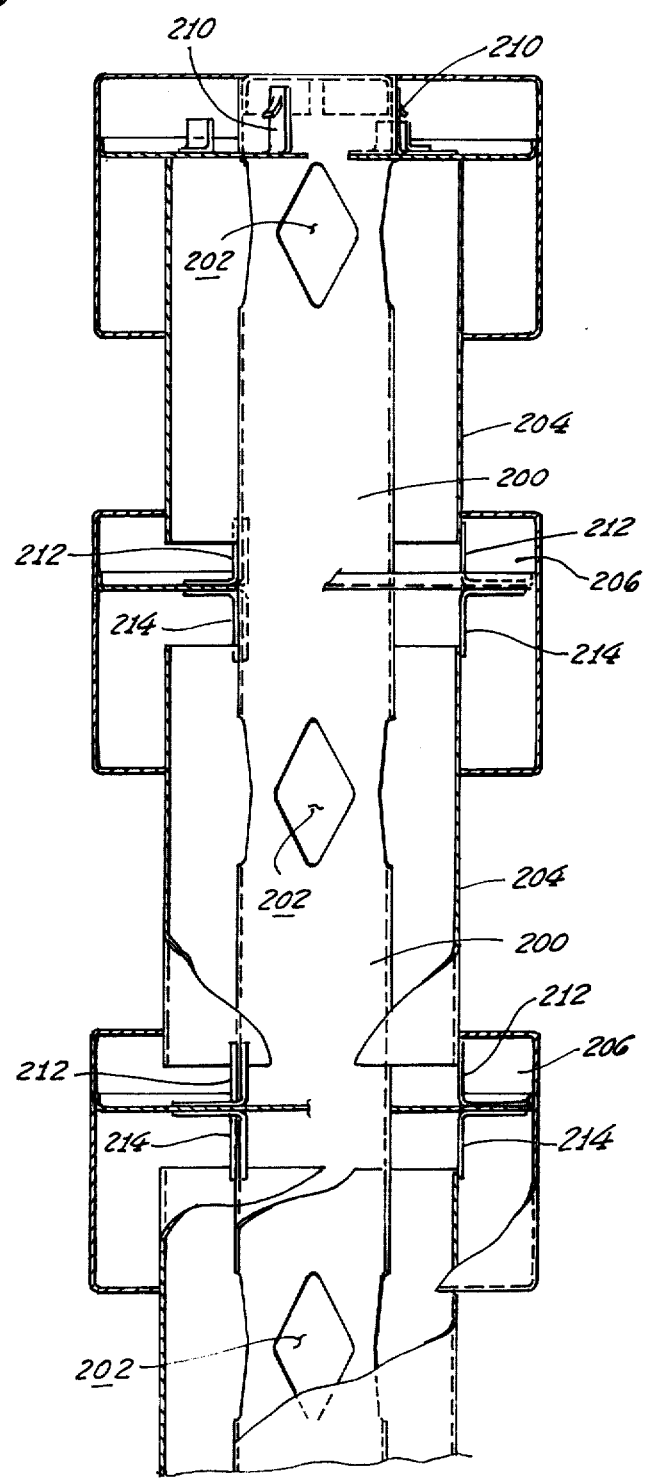
FIG. 10 is a fragmentary sectional view of a feeder system which is received through a central opening or shaft-like passage in the multi-decked container of FIGS. 7 and 8, and which is adjustable with respect to the deck of the container by the mechanism shown in FIG. 8.

The vertical feed assembly, such as shown in FIG. 10, extends down through the center of each container, and through a central opening 174 in each deck 168. The feeder system of FIG. 10 is of the same general type as shown, for example, in FIGS. 2, 3 and 4, and it includes a vertical feed tube 200 which has an open top, and which is positioned directly under a corresponding feed terminal of the feed system in the enclosure, as will be described in conjunction with FIG. 16.

In this embodiment, as in the previous embodiment, the feeder apparatus shown in FIG. 10 is actually a part of the container itself, and is removed with the container when the container is taken from the enclosure. Also, the apparatus of FIG. 10 is mounted in the associated container in a manner such that when the container is turned upside down for cleaning and sterilizing, the feeder mechanism does not drop out of the container, and the feed therein may be disposed of through its upper end. In this respect it is also advantageous to provide a valve at the bottom of the feed tube 200 which, when manually lifted, will allow all the feed in the feed tube to be discharged at the time of shipment of the container.

As in the structure of FIG. 4, the feed tube 200 has feed holes 202 at spaced positions along its length. Each feed hole 202 is surrounded by a cylindrical silo 204 in the latter embodiment, which permits the feed from the corresponding feed hole 202 to drop into a feed tray 206. The individual silos 204 are held in place on the central tube 200 by means of L-shaped welded brackets 210. The trays 206 are mounted on the corresponding silos by welded L-shaped brackets 212 and 214.

Figure 11:
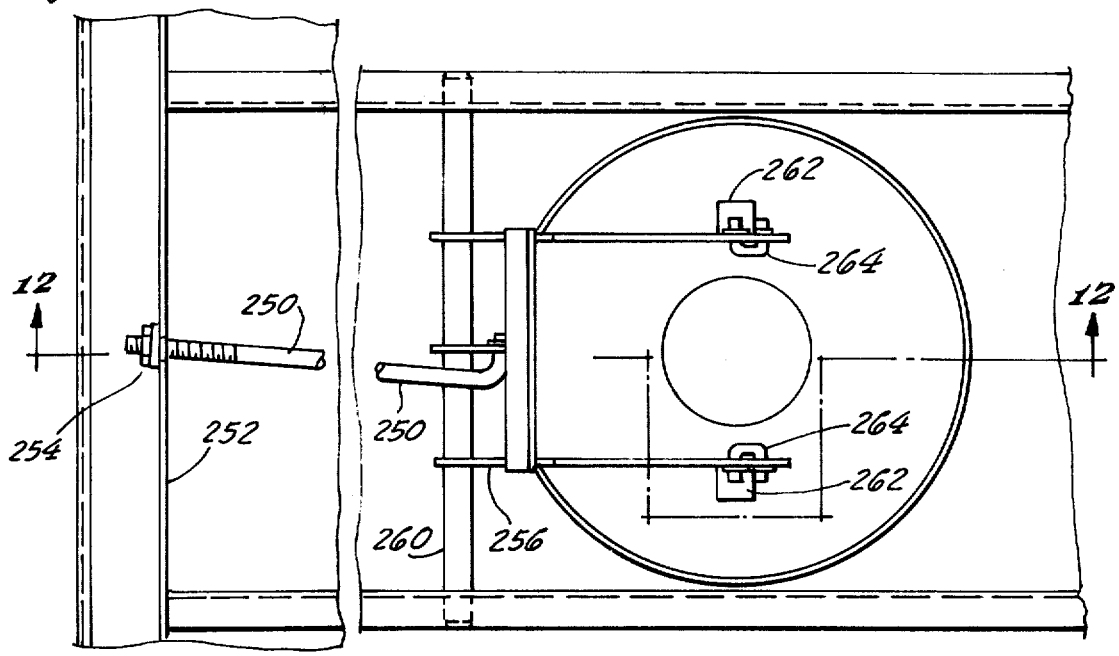
FIG. 11 is a top plan view of the container of FIGS. 7 and 8, showing further details of the feeder lift mechanism.
Figure 12:
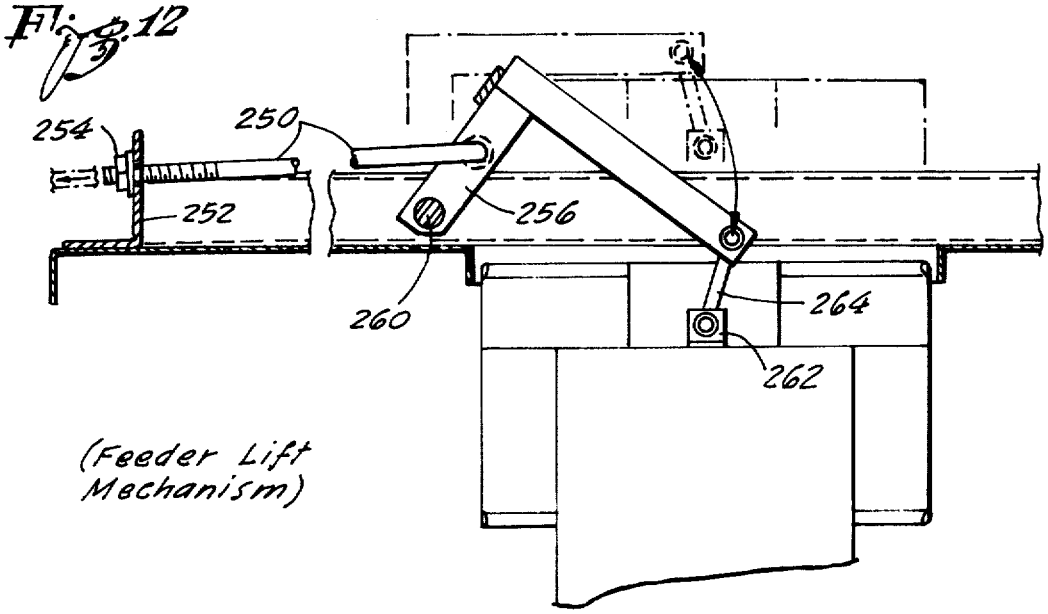
FIG. 12 is a section substantially along the line 12—12 of FIG. 11, and showing further details of the feeder lift mechanism.

The feed trays 206 may be raised up from the corresponding decks 168, as the fowl grow larger, so that they may be maintained at a comfortable feeding height for the fowl. This is achieved by raising the vertical feed tube 200 by means of a lift mechanism, such as shown in FIGS. 8, 11 and 12. The illustrated lift system includes a threaded rod 250 which extends through a bracket 252 at the top of the container. A nut 254 is threaded onto the end of the rod 250, and as the nut is tightened it causes the rod to turn a bracket 256 on a shaft 260. The bracket 256 has a yoke-like shape, and it is attached by links 264 to a pair of brackets 262 at the top of the tube 200. Therefore, when the nut 254 is tightened, the bracket 256 is turned in a counter-clockwise direction in FIG. 12 to move the trays to any convenient height from a lower position, such as shown in FIG. 12, to an upper position, such as represented by the position of the lift mechanism in FIG. 8.

As explained previously, by properly locating the feed holes 202 in the vertical feed tube 200, the upper feed silos are filled to a greater extent than the lower feed silos, on a continuous basis, so as to optimize the capacity of the feeder system and to permit reasonable intervals when the feed input from the top is shut off. It will also be appreciated that the feed tube 200, and its associated components and lifter mechanism, may be all mounted on the multi-decked container itself, to be removed from the feeder system when the container is removed. As mentioned above, an appropriate manually operated valve is preferably provided at the bottom of the feed tube 200, so as to permit the feed in the tube to be drained out when the container is to be removed. As also explained above, the feed tube 200, and its associated components, are mounted in the container in a manner to permit the container to be turned upside down for cleaning and sterilizing purposes, as described above, without the tube and its components falling out of the container.

Figure 13:
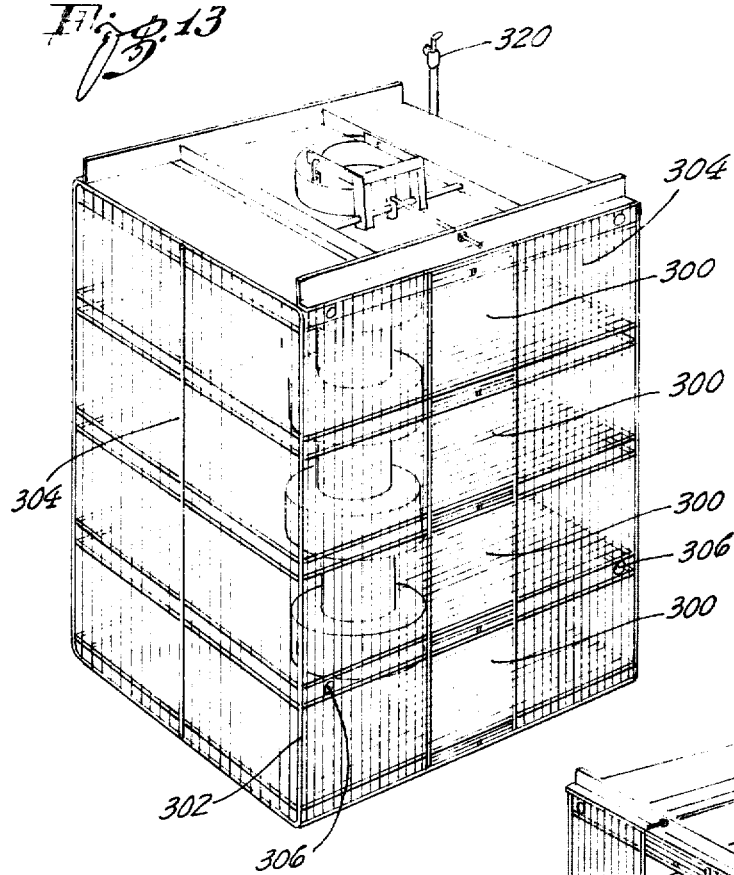
FIGS. 13, 14 and 15 are perspective representations of a further embodiment of the multi-decked container, and one which is particularly appropriate for the growth of leghorns, and the like, which have a tendency to shed their feathers during the growth period and which would result in the plugging of the perforated deck holes, in the embodiment shown in FIG. 9, for example.
Figure 14:
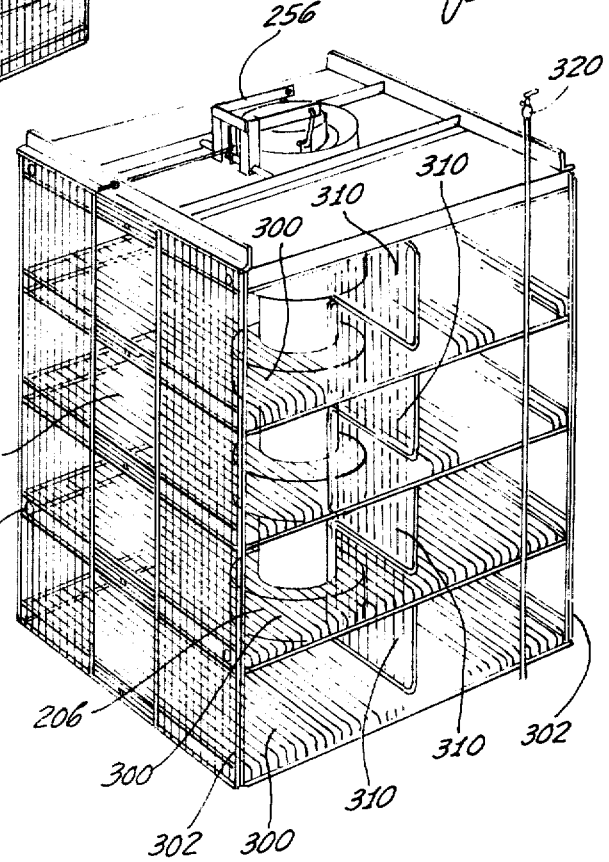
Figure 15:
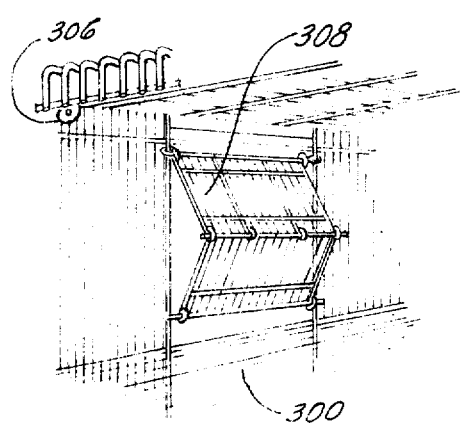

The container shown in FIGS. 13, 14 and 15 is essentially similar to the container of FIGS. 7 and 8, except that the decks are wire-formed in the latter container, as designated 300. In the latter containers, the decks 300 are supported in spaced and parallel relationship on upright rods 302, and the side walls 304 are appropriately bolted to the edges of the decks by bolts, such as the bolts 306. As best shown in FIG. 13, one of the side walls 304 has openings therein, and appropriate folding doors, such as the door 308 of FIG. 15, are provided in the respective openings.

The doors 308 permit access to the interior of the various compartments of the container. In addition, wire-formed partitions, such as the partitions 310, are provided, and separate each level of the container into two or more separate compartments.

Containers, such as the containers shown in FIGS. 13, 14, and 15 are particularly useful in the growth of leghorns. As mentioned, leghorns, in particular, shed their feathers prior to their normal 20 weeks of age required before they may be transferred to the egg production centers. These feathers would normally result in plugging of the apertured decks, such as shown in FIG. 9, so that the wire-decked containers of FIGS. 13, 14 and 15 are particularly appropriate for leghorns.

Also, the partitions 310 simplify the vaccination process of the leghorns in that the unvaccinated leghorns may be placed in each compartment on one side of a partition, and successively withdrawn on a one-by-one basis through the corresponding access doors 308, vaccinated, and then replaced into the container on the other side of the partition, so that the vaccinating operation is simplified and may be carried out rapidly and efficiently.

Although not shown in the drawings, it is to be appreciated that any appropriate watering system may be provided for the various containers, and a vertical tube 320 is shown in FIG. 14 which has drinking receptacles mounted on it at each compartment level, and which may be readily attached to an appropriate watering system within the enclosure. The vertical feed tubes described above, and the water tubes, such as the water tube 320, may be designed to operate with a variety of known automatic feeder and distribution systems. For example, an appropriate system is manufactured by Chore-Time Co., Inc., of Melford, Ind., and by Big Dutchman Co. of Zeeland, Mich., and by H. W. Hart Manufacturing Co. of Glendale, Calif., and other systems are also available on the market.

Figure 20:
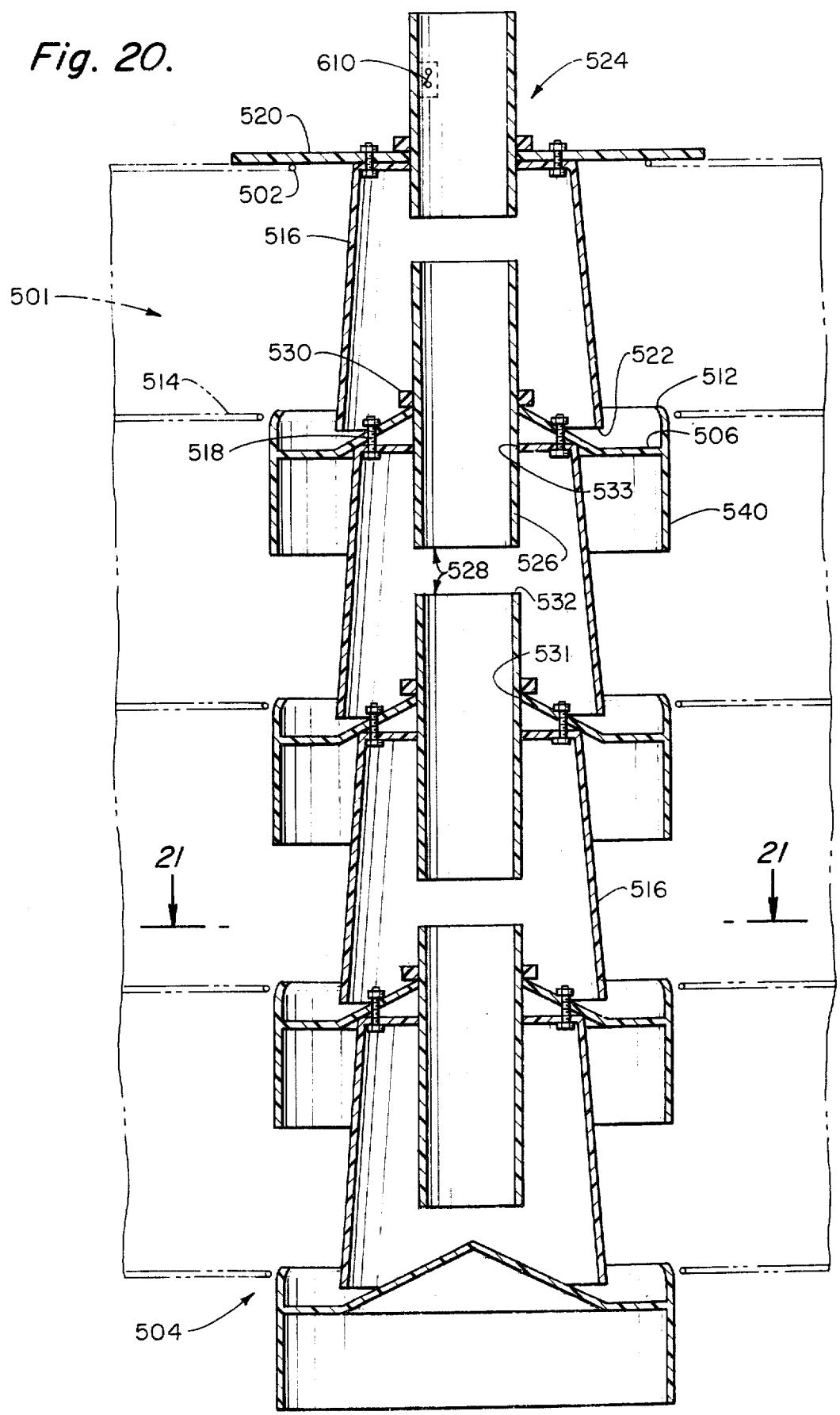
FIG. 20 is an enlarged fragmentary sectional elevation taken on line 20—20 in FIG. 19.
Figure 21:
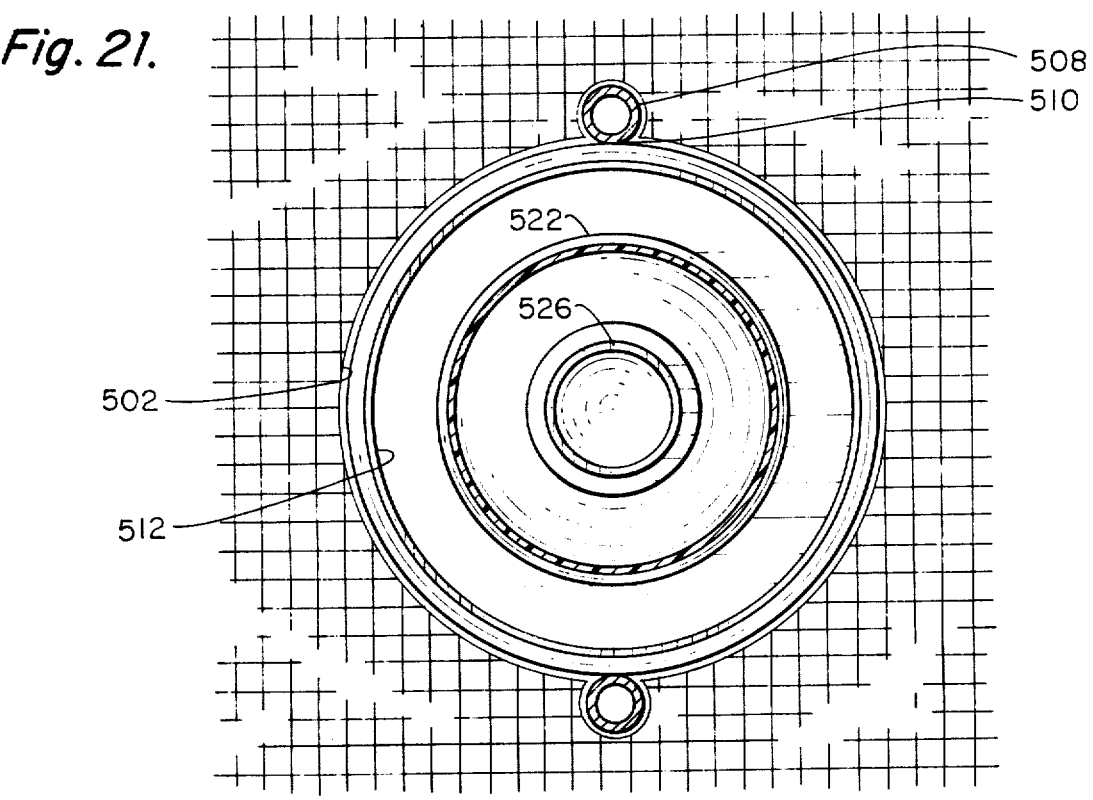
FIG. 21 is a cross section taken on line 21—21 in FIG. 20.

Still another embodiment of the invention is shown in FIGS. 18–21. The fowl container is shown in the form of a unitary structure 500, consisting of several, e.g. four, vertically disposed tiers or cages 501. A series of vertically aligned holes 502 in the cages 501 form a shaft-like passage in which is located a vertical tube or conduit feed means 504. The feed means comprises a plurality of vertically spaced feed trays 506 supported by a pair of diametrically located vertical rods 508 to which the edges of the trays 506 are secured as by welding at 510. As best seen in FIG. 20, each feed tray 506 has an upstanding peripheral rim 512 located above the floor 514 of the cage 501 which that feed tray is to serve.

Each cage 501 is also provided with a silo member 516 supported by means of a plurality of bolts 518 from the tray 506 immediately thereabove. In the case of the uppermost silo member 516, support is provided by a flat plate 520 closing off the corresponding opening 502. Each silo member 516 is in the form of a truncated cone, the lower edge 522 of which is located somewhat below the peripheral rim 512 of the feed tray 506 which that silo served.

In order to provide feed, such as grain, to each silo 516 and thence to each feed tray 506, there is provided a vertical feed tube means 524 consisting of a plurality of discrete, vertically aligned tubes 526 spaced apart as shown at 528, each space 528 forming a feed opening by which the grain may flow outwardly from the feed tube means 524 into one of the silos 516 and thence into the corresponding feed tray 506, from which it is consumed by the chickens or other fowl being raised in the cages 501.

Each of the feed tubes 526 is supported in a predetermined position by means of a collar 530 press-fitted around the tube 526, which rests on the floor of the tray 506 immediately circumjacent the hole 531 in the tray 506 through which the tube 536 passes. Each silo 516 also has a corresponding hole 533 through which the tube 526 passes.

In practice of the present invention, it has been found that all of the spaces 528 between the tubes 526 should be about the same distance in order to provide uniform flow of feed from the feed tube means into the several silos 516. However, as noted in connection with FIG. 5, the distance from the bottom edge of the opening 528, formed by the upper edge 532 of the tube 526, down to the bottom edge 522 of the corresponding silo, should vary along the height of the feed tube means 524. As will be readily evident, the greater the distance between the points 532 and 522 the greater will be the volume of annular storage space in the corresponding silo 516. Thus, as the supply of grain is exhausted in the several feed tubes 526, there will remain a reserve in each silo available to feed into each of the several trays 506. Since the grain, as it drops down in the feed tube means 524, will become exhausted first in the upper tubes 526, the distance from 532 to 522 is greatest in the uppermost of the cages 501 and progressively decreases to the lowermost of the cages 501, as seen in FIG. 20.

The height of each feed opening 528 above the lower lip 522 of the silo 516 may be readily adjusted by sliding the press-fit collar 530 up or down on the tube 526.

The feed means 504, as noted, is a unitary structure which may be raised and lowered in the shaft-like passage formed by the aligned holes 502, in order to adjust the distance from the cage floor 514 up to the peripheral rim 512 of the feed tray 506. This is done progressively as the chickens grow. When the chickens are tiny they must be given ready access to the feed tray 506 so that the rim 512 must be virtually flush with floor 514. However, as they grow, trays 506 should be raised progressively above the floor 514. As the trays 506 are raised with the raising of the unitary structure 504, the opening between the floor 514 and the trays, which would otherwise appear, is closed off by a depending cylindrical skirt 540 formed as an integral downward extension of the upstanding peripheral rim 512 of the feed tray itself.

Adjustment of the structurally unitary feed means 504 may be effected by a lifting and lowering mechanism generally shown in FIGS. 11, 12, 13 and 14.

Figure 16:
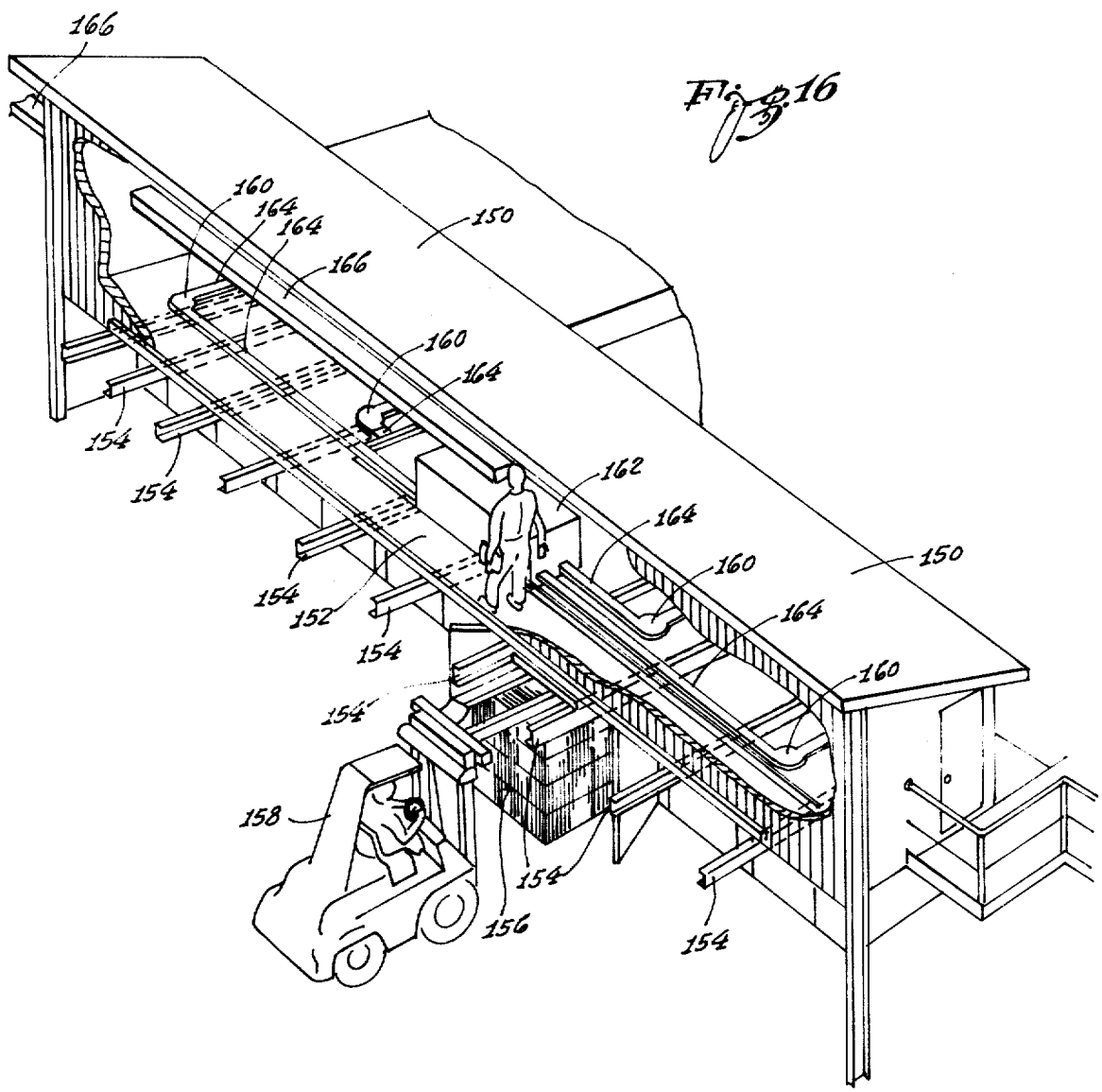
FIG. 16 is a perspective representation of a facility constructed in accordance with the concept of the system and process of the invention.

An enclosure or building for the containers 300 or 500 is shown in FIG. 16, and is designated generally as 150. The enclosure preferably contains an intermediate deck 152, and a plurality of racks 154 extend transversely under the deck 152 at spaced intervals along the deck. The containers described above are suspended, for example, on their trollies 172 (FIG. 7) from the rack 154 in a manner such that they may be easily inserted into the enclosure in proper position to be coupled to the automatic feed and watering system, and so that they may be easily removed from the enclosure when the loaded containers are to be delivered to the egg producing or meat processing centers.

A skip truck 158, forklift or the like, may be used to remove the containers, such as the container 156, from the racks, and to load the containers into appropriate trucks for shipment. The containers 156 are suspended by the racks 154 up from the floor of the enclosure 150, so that the droppings from the fowl in the containers will fall through the decks thereof and onto the floor of the enclosure for convenient and frequent removal.

Each multi-decked container 156 is moved on its rack 154 back to the rear of the enclosure, so that the vertical central feed tube 200 in each container may be aligned with respective terminals 160 of the automatic feed system. Appropriate feed from a feeder bin 162 is transported to the various terminals 160 through horizontal conduits 164, for example, and by means of appropriate auger mechanisms. The feed itself may be fed into the feeder bin 162 through a conduit 166 extending to the exterior of the enclosure and to an appropriate store of feed. As mentioned above, an appropriate watering system for the containers is also provided within the enclosure.

When the containers 156 are suspended in the enclosure 150, and when the feeder and watering systems have been coupled to the containers, the enclosure is closed, for example, by louvered doors such as doors 400 shown in the plan view of the enclosure of FIG. 17. Appropriate sliding louvered doors, such as the doors 400, and other sliding doors may be provided, in order to render the enclosure 150 completely light-proof, so that the interior light may be precisely controlled so as to optimize the growth of the fowl in the containers.

The louvers in the doors 400 enable a controlled environment to be achieved, whereby air is introduced into the enclosure, for example, by motor-driven fans 402 and 404 which are mounted in a plenum chamber 406 at the opposite end of the enclosure. The fans draw air into respective compartments 408 and 410 through louvered wall openings 412 and 414, and drive the air into the plenum chamber 406. The resulting air passes through openings in the plenum chamber wall 412, and the air passes down the length of the enclosure 150 and through all the containers therein, and is finally exhausted through the louvered doors 400.

In this way, a complete control of the airflow through the enclosure may be achieved. In addition, appropriate evaporative cooling water nozzles and splash baffles are provided within the plenum chamber 406, so that any desired humidity condition may be achieved. A heater, such as a gas heater represented by the block 420, may also be provided, so that a precise temperature control for the air may be achieved.

As an ancillary feature to the process of the invention, a greenhouse 618 may be provided adjacent to the poultry growth enclosure 620, so that the controlled warm and humidified air may be exhausted, if desired, through louvers 502 into the greenhouse and used for growing plants, or the like.

Therefore, a controlled micro-environment is provided within the enclosure 150 for containerized growing of poultry, or other small animals, and which also may be used for the growth of plants, as described above. The use of the containerized poultry, for example, in conjunction with the enclosure 150, provides the ability to control completely the growing environment for the poultry under optimum conditions.

The control of light in the enclosure is such as to obviate cannibalism of the fowl during the growing stage, so that there is no need for the fowl to be exposed to the sensitive "debeaking" process which has been found to be necessary in the prior art to control cannibalism. Also, the control of the environment within the enclosure helps to minimize disease among the fowl within the containers.

When wire-decked containers, such as described, for example, in conjunction with FIGS. 13, 14 and 15, are used, the process of the invention may be particularly applied for the growth of leghorns. As described, this provides a convenient and simplified means for producing leghorns properly vaccinated and ready for transfer to the egg-producing centers.

Figure 22:
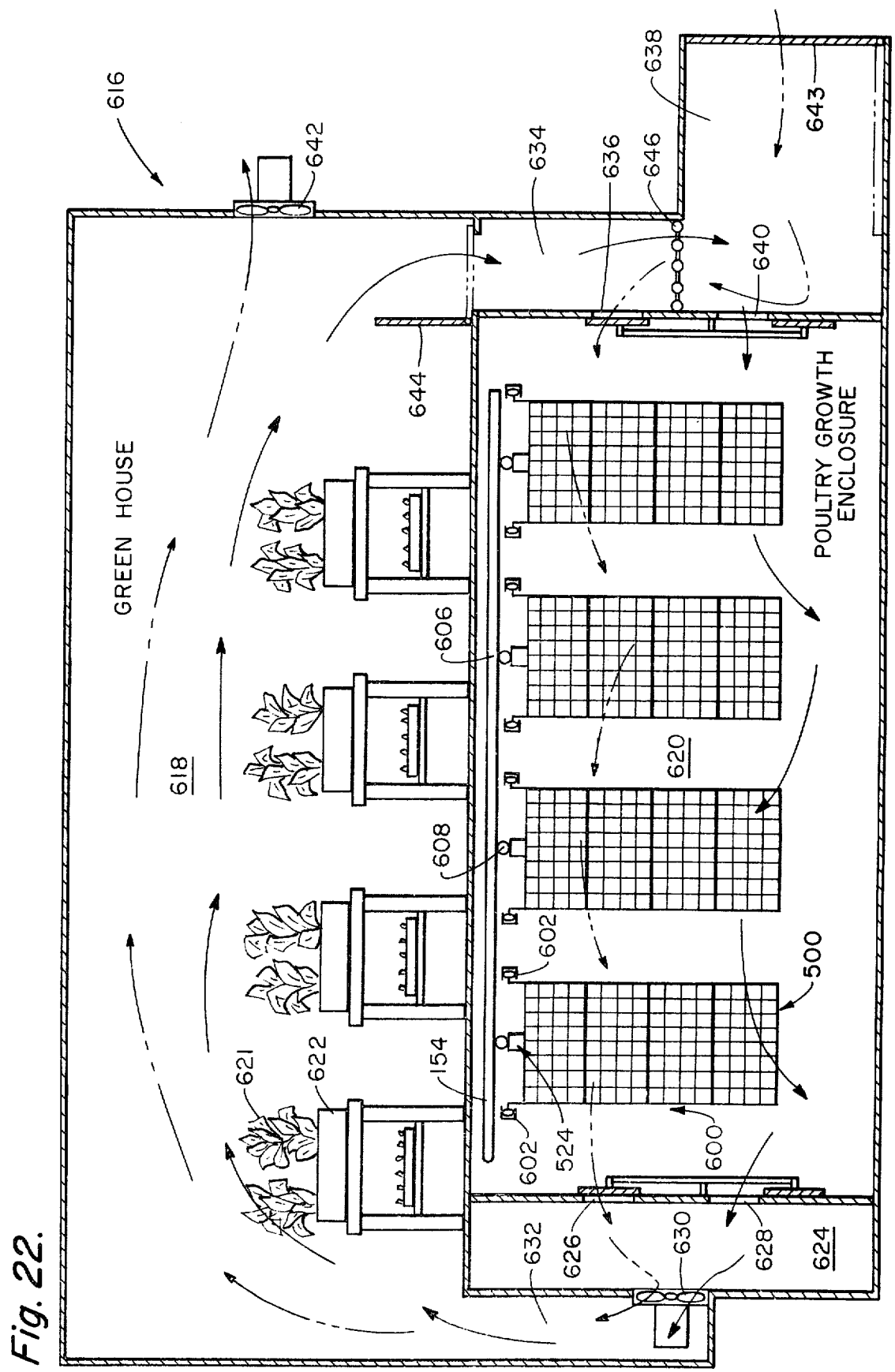
FIG. 22 is a sectional elevation, somewhat schematic, of a building or housing structure for the combined growing of plants and animals.

A plurality of the four-tiered fowl containers, such as 300 or 500, may also be housed in a structure as shown in FIG. 22. Each container 500 is provided at each of its four corners with a roller 602 riding in channel rails 154 (See FIG. 16) mounted near the ceiling of the structure or building shown in FIG. 22. This mounting is below a grain auger 606 which distributes the grain laterally to a series of inferior cross augers 608 by means of suitable transfer openings. Each of the augers 608 in turn has an opening immediately above one of the vertical feed tubes or conduits 524. Thus grain may be augered continuously from a hopper (not shown) into one end of the auger 606 to the cross auger 608, thence dropping down into the several vertical feed tube means 524. At the upper end of each feed tube means 524 is a conventional sensing switch, shown schematically at 610 (FIG. 20), which serves to cut off the feed supply when the grain has risen to the top of that feed tube means 524 which is most remote from the hopper.

By suspending the cages or containers 600 completely off the floor 612, the cleaning of the floor is greatly expedited. The containers are readily removed from the end of the building, as shown in FIG. 16, by being rolled on their rollers 602 to the end of the channels 154, where they are received by the forklift truck 158.

FIG. 22 also illustrates another aspect of the present invention in which the housing 616 includes an upper compartment or story 618 in which plants 621 are grown, and a lower compartment or story 620 in which livestock is grown, in this case the fowls or chickens housed in the containers 500. The atmosphere created by the various body discharges from the growing fowl in the containers 500 is well suited to nurture the plants contained in the plant growing containers 622; and conversely the atmosphere created by the growth of the plants 621 is well suited to nurture the fowl growing in the lower compartment 620.

There is provided a plenum 624 at one end of the lower compartment 620 into which the atmosphere from 620 can pass, through a series of upper windows 626 and lower windows 628. From the plenum 624 the atmosphere or air is circulated by means of a fan 630 into a vertical passageway 632, and thence into the upper compartment 618. It then flows horizontally to the right in the compartment 618 and is then returned to a plenum 634, from whence it is again passed back into the lower compartment 620 through windows 636 or 640.

In the summertime it is desirable to circulate outside air through the lower compartment 620, and hence there is provided an outside air inlet 638, from whence air is passed through the upper windows 636 into compartment 620. In the summertime the outside air, usually being cooler than the air inside compartment 620, is admitted to the upper portion of the compartment 620, through windows 636, and is withdrawn at the opposite side of the compartment 620 through the upper series of windows 626. It is then drawn by fan 630 into passage 632, then into compartment 618, and thence discharged to the atmosphere via a fan 642. Under summer-time conditions of operation, a trap door 644 closes off the passage 634, so that all of the air is discharged through 642. Thus, depending on the outside temperature, there may or may not be any air recirculated from the upper compartment 618 back to the lower compartment 620.

In the wintertime it may be desirable to recirculate virtually all of the air and to heat it in its circulatory path. Under these circumstances the trap door 644 is left open, and the air is passed through suitable heating means shown at 646, and thence into the lower portion of the compartment 620 via the series of windows 640. It is withdrawn from the compartment 620 via the lower windows 628 and thence directed by the fan 630 through the upper compartment 618 and back down into the chamber 634. Under wintertime operations the fan 642 is not in operation. A door 643 may be used to selectively close off as much of the inlet 638 as desired.

Figure 23:
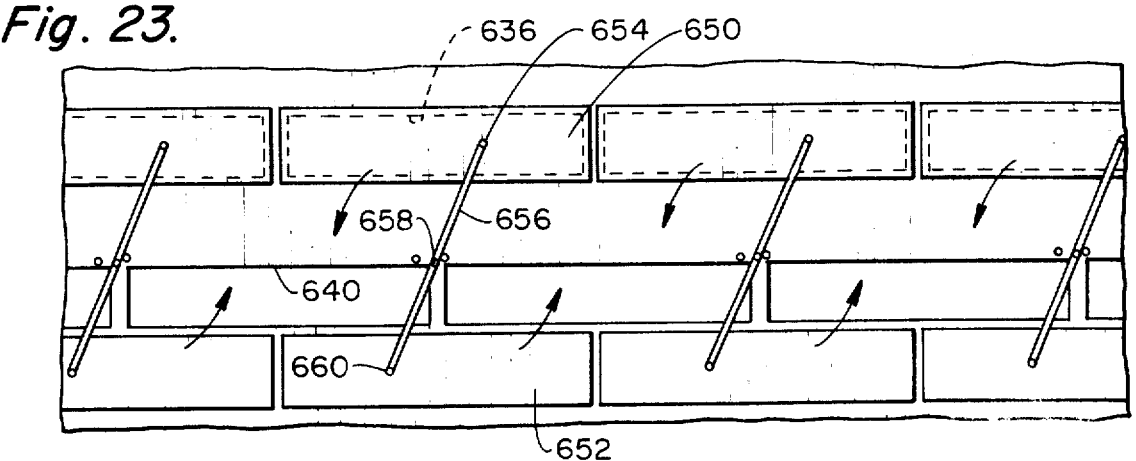
FIGS. 23 and 24 are elevational views showing a louver or valve plate system for use in the building of FIG. 22, the former showing a first position of the louvers and the latter a second position thereof.
Figure 24:
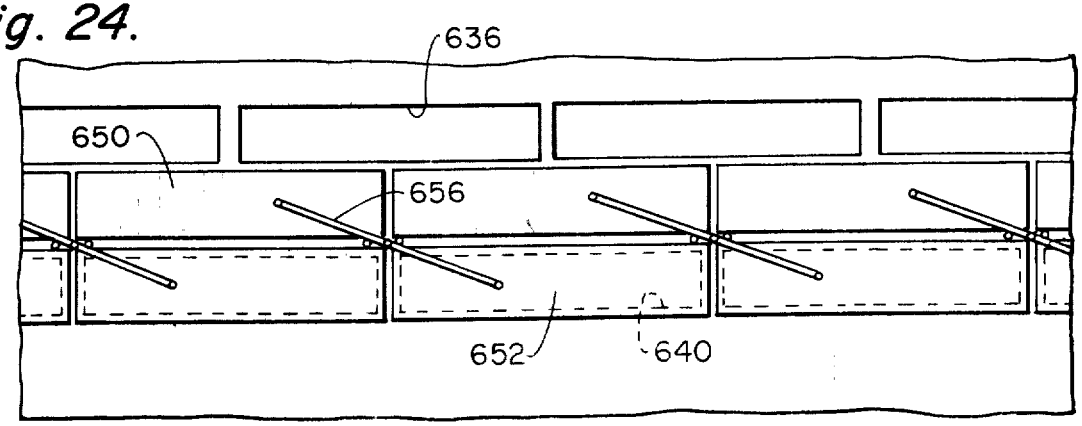

As will be obvious the air may, for intermediate conditions, be divided between the upper windows 636 and the lower windows 640, with only a portion of the air being heated, while the remainder enters the compartment 620 through the windows 636 without being heated. It is desirable, however, that the aggregate opening area represented by the windows 636 and 640 be substantially constant, and to that end an interlocked series of flat louvers or slide valves, as shown in FIGS. 23 and 24, is provided to bring about such constancy of opening.

As shown in these figures, the upper windows 636 each has a corresponding flat louver or shutter plate 650 serving as an air valve which slides in a circular path across the window 636 to close it, or selectively open it, to any degree desired. Correspondingly each of the windows 640 has a corresponding louver or shutter plate 652 which selectively slides across its face to close it off to any degree desired. The shutter plates 650 are pivoted at 654 to the upper end of arms 656, pivoted to the wall structure of the building at 658. The lower ends of the arms 656 are pivoted to the lower 652. plates 652, As the arms 656 are pivoted counterclockwise from the position shown in FIG. 23, to the position shown in FIG. 24, the windows 636 are steadily uncovered or opened, while the windows 640 are steadily covered up. Thus, the sum total of the opening represented by the windows 636 and 640 always remains constant, the lower windows 640 being closed off at the same rate that the upper windows 636 are being opened.

Any suitable linking mechanism may be provided to actuate and control the arms 656 and set them at any desired opening position.

A similar arrangement is provided at the left-hand end of the building 616 to control the opening of the windows 626 and 628.

The invention provides, therefore, an improved system and process for the growth of fowl, and other small animals. In the practice of the process, and as described above, a growth house or enclosure is provided which gives full weather protection, variable environmental controls, adaptable to the pertinent requirements of the particular husbandry involved for ultimate production conditions. These controls include, as described in conjunction with FIG. 17, the control of air movement, temperature and light density. Also, the enclosure itself may be easily cleaned and biologically treated during the growth cycle, and at the completion of each growth cycle, for the removal of solid waste and the like, so that toxic conditions may be minimized for optimum disease control.

As also described, the individual containers for the fowl are suspended by overhead racks and trollies within the enclosure, so that they may be easily removed at the end of the growth cycle and shipped to the egg producing or meat processing centers, without disturbing the fowl within the containers. The containers, as also described, are provided with feed and watering apparatus, which is easily and simply coupled to an automatic feeder and water complex within the enclosure, as each container is moved into position in the enclosure.

As described, the fowl are grown entirely within the containers, and are removed in the containers to the egg producing or meat processing plant, so that minimum labor is required in the transportation of the fowl, and the fowl has minimum exposure to adverse conditions, such as fright or physical damage.

In practicing the process of the invention, the fowl may be loaded into the mobile containers at an early age when fright and physical damage is minimized, and the containers may then be positioned in the enclosure, as described above. The fowl within the containers are then allowed to develop within intimate reach of food and water, and under ideal environmental conditions. The fowl is then removed in the containers by any appropriate means to the egg producing ranch or meat processing center.

After the fowl have been removed from the containers at the meat processing plant or egg producing center, the containers are thoroughly cleaned, as described above. They may then be returned in an unloaded condition to the enclosure, where further sterilizing and fumigating may be carried out, as described, or they may be cleaned and sterilized, loaded with new fowl, and then introduced into the enclosure.

When the containers are moved, for example, to a slaughter house, the containers may be passed through an appropriate atmosphere, as mentioned above, so as to render the fowl docile or unconscious, to a point they will not suffer damage to their bodies from fright during the slaughter operation.

As mentioned above, the house or enclosure is so designed and fabricated that all ventilation and light requirements are completely controlled by artificial means, with the supply of air being carefully tempered to desired ambient conditions for optimum growth. The air is then caused to flow evenly through the enclosure from a plenum chamber at one end and out through the louvered doors at the other end, as described in conjunction with FIG. 17. Artificial light only is provided within the enclosure, and is controlled to the exact candle power desired for the particular husbandry involved during any growth cycle. As also mentioned, a prime reason for the artificial light control is to reduce cannibalism.

An important part of the process are the improved containers which, as described, are constructed so as to be appropriate for use in conjunction with automatic feeder and watering systems, and so as to provide for the easy removal of waste products from the fowl. The feeder apparatus within each container is constructed so that even in the event of an interruption in the feeding system, the feed is evenly distributed to all decks, so that prolonged interruptions may be tolerated without affecting the fowl within the containers. The containers themselves have adequate access doors for servicing the fowl, and, as described, may have internal partitions to facilitate vaccination and other processes.

While particular embodiments of the process and system of the invention have been described herein, modifications may be made. It is intended in the following claims to cover all modifications which come within the spirit and scope of the invention.

What is claimed is:

1. Growth apparatus for fowl, or the like, comprising:
   a container having tiers of enclosed compartments disposed vertically above one another;
   vertical feed tube means extending between said tiers and having feed openings therein at levels corresponding to the interior of the individual compartments;
   a plurality of feed trays;
   first support means for supporting said feed tube means and said trays coaxially with respect to each other, with said trays being spaced along said feed tube means and under respective ones of said openings in said feed tube means, to receive feed from the interior of said feed tube means through said openings;
   a corresponding plurality of silo members and;
   second support means for supporting said silo members coaxially circumjacent said tube means and surrounding respective ones of said feed openings, with the lower edges of said silo members spaced up from the bottom of the corresponding ones of said trays; and
   each of said trays having a dish-shaped configuration and including an upstanding peripheral rim surrounding the lower edge of the corresponding silo member.

2. Apparatus in accordance with claim 1 including: means for securing together said tube means, said feed trays and said silo members into a substantially unitary feed means structure.

3. Apparatus in accordance with claim 2 including: means for vertically adjusting the height of said structure with respect to said compartments;
   whereby the height of said trays with respect to the floors of their respective compartments may be raised as the fowl grow.

4. Apparatus in accordance with claim 3 and including:
   skirt means departing from the periphery of said trays, thereby to block passage of fowl from one compartment to the compartment below, when said structure is raised.

5. Apparatus in accordance with claim 1 wherein said first support means comprises:
   a plurality of vertical rods secured to the periphery of said trays.

6. Apparatus in accordance with claim 2 including: vertically aligned holes communicating with said compartments and forming a shaft-like passage for reception of said structure.

7. Apparatus in accordance with claim 1 wherein said silo members are supported by said feed trays.

8. Apparatus in accordance with claim 1 wherein said first support means includes:
   a plurality of collars located coaxially around said tube means at spaced positions therealong and resting on said trays,
   thereby to support said tube means on said trays.

9. Apparatus as defined in claim 1 wherein:
   said second support means comprises a plurality of removable pins extending through corresponding ones of said silo members and into said tube means to support said silo members.

10. Apparatus as defined in claim 1 in which said trays are supported by said first support means, at progressively greater distances below said feed openings, from the bottom to the top of said apparatus.

11. Apparatus in accordance with claim 1 wherein: said tube means comprises a plurality of discrete, vertically aligned and spaced tubes; and
    said openings comprise the space between said tubes.

12. Apparatus as defined in claim 1 wherein said first support means includes a plurality of support brackets mounted in press fit on said tube means at spaced positions therealong and supporting said trays.

13. Apparatus as defined in claim 1 wherein:
    each of said compartments has an opening in the bottom thereof; and
    in which said trays are respectively mounted coaxially of said compartment openings.

14. Apparatus as defined in claim 13, in which each of said trays has a central opening and said tube means comprises a plurality of individual tubular members supported in corresponding ones of said tray openings in spaced axially alignment to be adjustable axially with respect to one another.

15. Apparatus as defined in claim 1 and which includes a pair of elongated, spaced and parallel platforms for supporting said container.

16. Apparatus as defined in claim 1 in which said container is formed by a plurality of decks;
    bracket means supporting said decks at spaced levels one above the other; and
    wire-formed side walls supported on the edges of said decks.

17. Apparatus as defined in claim 1 and which includes:

rack means for said container; and means for supporting said container on said rack means to be suspended therefrom and displaced up from the floor of the facility in which the apparatus is installed.

18. Apparatus as defined in claim 1, in which said tiers are formed of a plurality of decks supported at spaced positions one above the other, and in which said trays are supported adjacent respective ones of said decks.

19. Apparatus as defined in claim 18 and which includes a mechanism coupled to said trays for raising said trays with respect to the respective decks.

20. Apparatus as defined in claim 1 in which:

said tiers include a plurality of decks supported in spaced positions one above the other;

said deck having perforations therein to permit droppings of the fowls to pass therethrough and to the floor of the facility in which the apparatus is installed.

21. Growth apparatus for fowl or the like comprising:

a plurality of vertically disposed compartments adapted to house the fowl;

feed conduit means passing vertically between said compartments, for receiving, storing and passing feed to the fowl;

opening means in said conduit means located within the respective said compartments, for passing feed to the fowl therein;

a plurality of feed trays in the respective said compartments, located below the respective said opening means, for receiving feed from said conduit means and dispensing it to the fowl;

a plurality of silo means between said opening means and said trays, for storing feed between the passage of the feed from said opening means to said trays;

the opening means in a given compartment being spaced a greater distance above its respective tray than the corresponding spacing in the compartment next below;

whereby each successive silo means, moving downward, stores a decreasing quantity of feed;

thereby substantially equalizing the quantity of stored feed available to each tray.

22. A growth system for fowl, and the like, and which includes:

an enclosure having a floor, and at least one support rack mounted above the floor;

at least one fowl container supported by said rack, and suspended thereby up from the floor of the enclosure and movable along the rack to be removed from the enclosure;

said container comprising a plurality of perforated decks supported in spaced relationship above one another, and four side walls respectively supported in clips formed in the edges of said decks;

a feed conduit extending above said racks, and including a tubular member extending upwardly through said decks to receive feed from said conduit and supply feed to the fowl in the container, said tubular member having feed holes therein at levels corresponding to the levels of said decks, a plurality of annular-shaped feed trays supported in spaced relationship on said tubular member under respective ones of said feed holes in said tubular member to receive feed therefrom, and a corresponding plurality of tubular silo members supported to surround respective ones of said feed holes in said tubular member and having their lower edges spaced up from the bottoms of corresponding ones of said feed trays.

23. The system defined in claim 22, and which includes a mechanism coupled to said feed trays to move said feed trays upwardly with respect to the corresponding ones of said decks.

* * * * *